March 18, 1969  D. H. KRAFT  3,433,512
SHAFT MOUNTING

Filed March 20, 1967

INVENTOR.
DERALD H. KRAFT
BY
Meyer Tilberry & Body

United States Patent Office 3,433,512
Patented Mar. 18, 1969

3,433,512
SHAFT MOUNTING
Derald Henry Kraft, Canton, Ohio, assignor to E. W. Bliss Company, Canton, Ohio, a corporation of Delaware
Filed Mar. 20, 1967, Ser. No. 624,586
U.S. Cl. 287—52.05          2 Claims
Int. Cl. F16d *1/06;* B60b *27/06;* F16l *59/16, 21/00, 55/00*

ABSTRACT OF THE DISCLOSURE

This disclosure pertains to a coupling between a shaft and collar or other part or parts employing an arrangement of keys and keyways to prevent both relative rotational and axial movement. The shaft is provided with an axially extending keyway and also a slot circumferentially spaced therefrom. A cylindrical bore in the other part adapted to receive the shaft is likewise provided with an axially extending keyway adapted to register with the keyway in the shaft and an arcuate groove extending circumferentially from the keyway for a distance at least equal to the number of degrees which separate the keyway and slot of the shaft. The arrangement permits assembly of the part and shaft with the keyway of the former initially aligned with the slot in the shaft. In the proper relative longitudinal position, a key member positioned in the slot on the shaft is rotatable in the arcuate groove of the part. The part and shaft can then be rotated relative to each other until the keyway in the part is aligned with the keyway in the shaft. A second key member is then received in the aligned keyways locking the assembly against further rotational movement.

*Disclosure*

The invention is described in relation to a rotary limit switch employing an adjustable drive mechanism mounted on the limit switch shaft. In the past, attaching the adjustable drive mechanism to the limit switch shaft has involved a piecemeal assembly of separate drive mechanism parts.

In the prior arrangement, a specially machined groove is placed on the shaft near the limit switch housing which is adapted to receive a snap ring, the purpose of which is to secure a collar onto the shaft. Thereafter other parts of the adjustable drive mechanism such as a drive sprocket and an adjusting gear train are assembled on the shaft utilizing an arrangement of keys received in keyways on the shaft. However, it will be appreciated that the invention is not limited to rotary limit switch applications and may be employed wherever it is necessary to couple a part to a shaft utilizing key members to prevent both relative axial and rotational movement between the two.

In various mechanisms it is often necessary to assemble a collar or hub onto a shaft. Often, as in the prior art rotary limit switch adjustable drive mechanism, assembly of the parts cannot be made separate from the shaft and instead must be mounted, piecemeal fashion, directly onto the shaft.

These and other difficulties are obviated with the present invention where it is provided that a pair of shaft keyways are utilized in conjunction with a pair of keys permitting a previously assembled part to be installed on the shaft as a complete unit and subsequently locked in position against relative axial and rotational movement.

As provided by the invention, a shaft member is adapted to be received in a part member which members are coupled to prevent relative axial or rotational movement. The coupling comprises an axially extending keyway and a key opening angularly displaced relatively thereto on one of the members. An axially extending keyway in the other member is adapted to register with the keyway in the one member. An arcuate groove in the other member extends circumferentially from its keyway to at least the same number of radial degrees as separate the keyway and key opening of the one member. A pair of keys, one preventing relative rotation of the members and the other relative axial movement, are receivable in the keyway and key opening, respectively. With the members assembled in longitudinal position, the one key coincides with the arcuate groove in the other member. Upon rotation of one member relative to the other, the keyways in each are brought into registration permitting assembly of the other key.

Further in accordance with the invention, the keyway and key opening on the one member are displaced 180° from each other. The arcuate groove has an axial and radial dimension slightly greater than the maximum length and height of the one key when installed so as to receive the key and permit free relative rotation with it in position.

One object of the invention is to provide a shaft coupling formed by an arrangement of keys and keyways which prevent relative rotational and axial movement.

It is a further object of the invention to provide a coupling for a plurality of parts which can be handled as a unit and assembled onto a shaft.

Still another object is to provide an arrangement of keys and keyways permitting a method of assembly of parts on a shaft which includes as a step in the assembly process, turning one rotatable element relative to another while a key is in place between the elements and assembling a second key after a predetermined relative angular displacement.

These and other objects will be more apparent by referring to the following description and drawings wherein.

Figure 1:
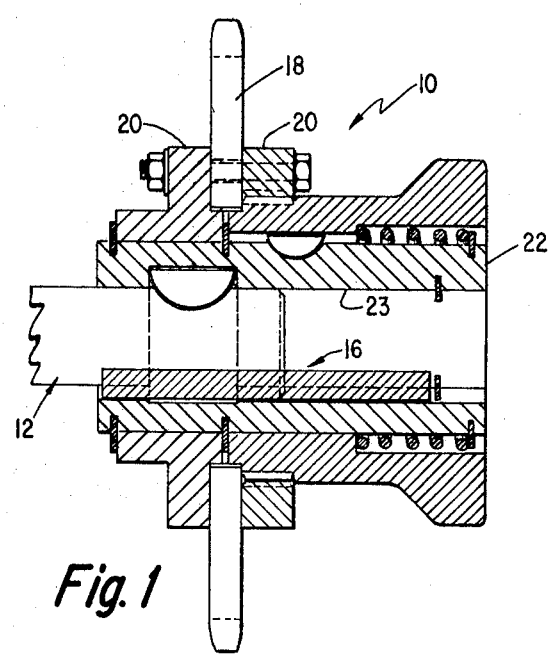
FIGURE 1 is a cross sectional view of an adjustable drive mechanism mounted on a rotary limit switch shaft in accordance with the preferred embodiment of the invention.
Figure 2:
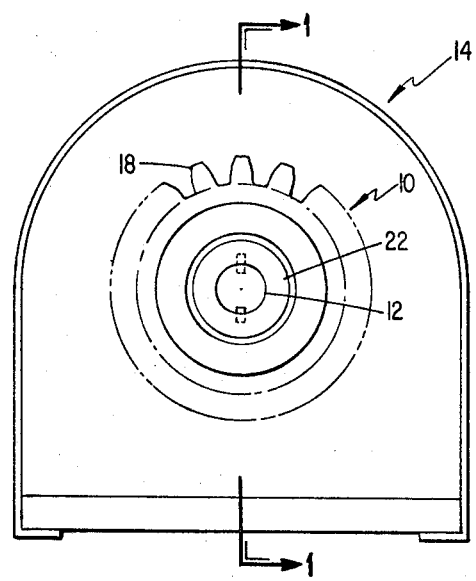
FIGURE 2 is an end view of the adjustable drive mechanism of FIGURE 1.

Referring now to the drawings wherein the showings are merely for the purpose of illustrating a preferred embodiment of the invention and not for the purpose of limiting same, FIGURES 1 and 2 show an adjustable drive mechanism 10 mounted on a rotary limit switch shaft 12 of a rotary limit switch 14. A coupling generally indicated by the numeral 16 secures the adjustable drive mechanism 10 onto the limit switch shaft 12 to prevent relative angular and axial movement of the two.

Briefly, the adjustable drive mechanism 10 includes a sprocket 18 which is bolted to an internally geared hub 20 carried on a sleeve 22 having a bore 23 receiving the end of the limit switch shaft 12. It will be understood that the arrangement of the adjustable drive mechanism 10 and rotary limit switch 14 form no part of the invention, but merely serve as an example of one use where prior assembly of the drive mechanism 10 may be made and then subsequently, the entire unit is secured to the shaft 12 utilizing the novel coupling 16.

Figure 3:
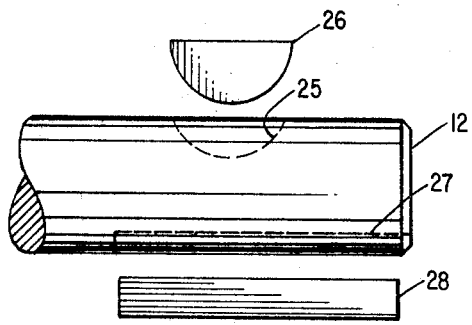
FIGURES 3 and 4 are side and end views of the rotary limit switch shaft showing the keys and keyway arrangement therein.
Figure 4:
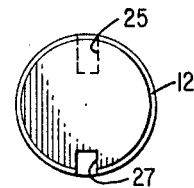

Referring now to FIGURES 3 and 4, the shaft 12 has a key opening or slot 25 adapted to receive a Woodruff key 26 and at 180° therefrom, an axial keyway 27 adapted to receive a key 28. The angular displacement of the slot 25 and keyway 27 is a matter of choice but standard procedure is that they be 180° from each other.

Figure 5:
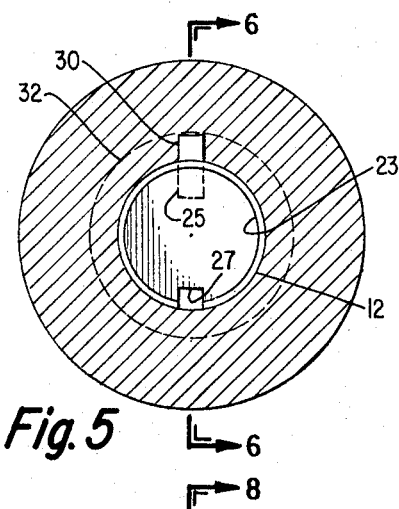
FIGURES 5 and 6 show the first assembly step onto the shaft with one key member in place.
Figure 6:
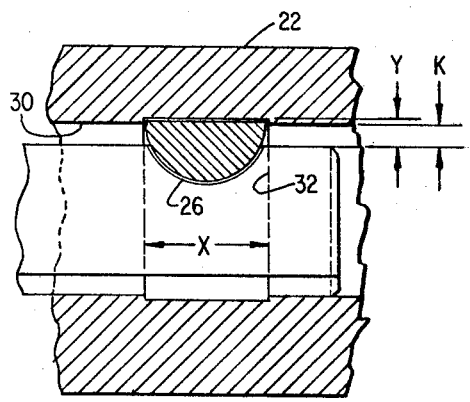

In FIGURES 5 and 6 the complete drive mechanism 10 is represented by the sleeve 22 as shown, during the first step in forming the coupling, the Woodruff key 26 is in place while the standard key 28 is not. The sleeve 22 has its bore 23 provided with an axial keyway 30 adapted to eventually match up with the axial keyway 27 in the shaft, but during the initial assembly step, keyway 30 is aligned with the slot 25 in the shaft. The depth of the keyway 30 is slightly greater than the height of the Woodruff key 26 by an amount equal to $Y$ minus $K$ when installed in its slot 25 in the shaft.

In accordance with the invention, there is an arcuate groove 32 in the bore 23 of the sleeve 22 which extends circumferentially through at least the same number of radial degrees as separate the slot 25 and keyway 27 of the shaft 12 which is in the preferred embodiment is 180°. For machining purposes groove 32 is milled out at 360° and is slightly larger in the X dimension than the Woodruff key 26 in an axial direction. It is also slightly deeper than the keyway 30 in the sleeve to permit free relative rotation of the sleeve on the shaft as will be described hereinafter.

In the method of assembly, the Woodruff key 26 is mounted in the slot 25 on the shaft 12 as the sleeve 22 is slid over the shaft with the keyway 30 aligned with the slot 25 as shown in FIGURE 5 until the proper longitudinal position is established with the groove 32 coinciding with the Woodruff key 26.

Figure 7:
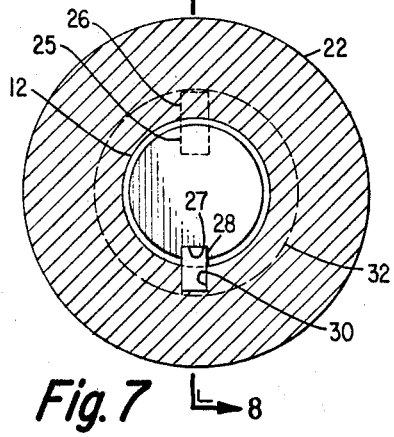
FIGURES 7 and 8 illustrate the final assembled position after relative rotation of the parts so as to permit insertion of the second key.
Figure 8:
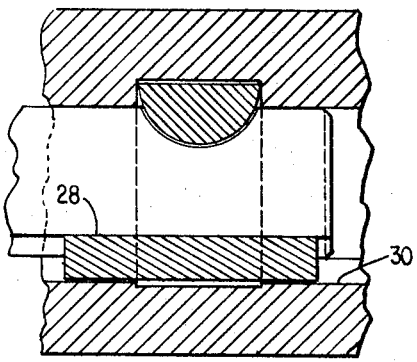

Referring now to FIGURES 7 and 8, the next step is to rotate the sleeve 22 on the shaft 12 or vice versa for 180° bringing the keyway 27 in the shaft into alignment with the keyway 30 in the sleeve 22. With the keyways 27, 30 aligned, the standard key is inserted to lock the shaft and sleeve 22 against relative angular movement while the Woodruff key 26 locks the two against relative axial movement.

Having thus described my invention, I claim:

1. A drive shaft coupling for preventing relative axial and rotational movement between a shaft means and a coupling means comprising:
    (a) cylindrical drive shaft means having an outer peripheral surface and an end face means,
    (b) coupling means having a cylindrical bore therethrough and opposite end face means, said coupling member having an inner peripheral surface defining said bore,
    (c) a circumferential groove in one of said peripheral surfaces positioned axially inwardly of said end face means,
    (d) key means projecting radially outwardly from the other of said peripheral surfaces,
    (e) an axial groove in each of said peripheral surfaces opening axially outwardly at said end face means,
    (f) said axial groove in said one peripheral surface intersecting said circumferential groove and defining the only opening from said circumferential groove to said end face means,
    (g) said axial groove in said other peripheral surface being circumferentially displaced from said key means to provide a portion of said other peripheral surface between said key means and said axial groove,
    (h) said other peripheral surface having a substantially uniform diameter along its length interrupted only by said key means and said axial groove,
    (i) stop means in said circumferential groove,
    (j) said shaft means being receivable in said bore with said key means passing through said axial groove in said one peripheral surface to a predetermined position in which said key means is in rotational registry with said circumferential groove,
    (k) said shaft means and coupling means being rotatable relative to one another over an arc less than 360 degrees when in said predetermined position to a rotated position in which said key means abuts said stop means and said axial grooves are in axial alignment, and
    (l) a key member received in said axial grooves, said key member projecting radially outwardly from both of said peripheral surfaces to be subject to transverse shear along its entire length.

2. The coupling of claim 1 wherein said circumferential groove is in said inner peripheral surface of said coupling member and extends over an arc of substantially 180 degrees, said circumferential groove having end terminations defined by said axial groove and by said stop means.

References Cited

UNITED STATES PATENTS

| 1,472,798 | 11/1923 | Gyllsdorff | 287—53 X |
| 3,318,384 | 5/1957 | Brown | 285—91 |

CARL W. TOMLIN, *Primary Examiner.*

DAVE W. AROLA, *Assistant Examiner.*

U.S. Cl. X.R.

287—53